United States Patent
Wakrat et al.

(10) Patent No.: US 8,495,332 B2
(45) Date of Patent: *Jul. 23, 2013

(54) CONTROLLER FOR OPTIMIZING THROUGHPUT OF READ OPERATIONS

(75) Inventors: Nir Jacob Wakrat, Los Altos, CA (US); Vadim Khmelnitsky, Foster City, CA (US); Daniel Jeffrey Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 922 days.

This patent is subject to a terminal disclaimer.

(21) Appl. No.: 12/509,240

(22) Filed: Jul. 24, 2009

(65) Prior Publication Data

US 2011/0022781 A1    Jan. 27, 2011

(51) Int. Cl.
*G06F 13/00* (2006.01)

(52) U.S. Cl.
USPC ........... 711/173; 711/103; 711/135; 711/202; 711/206

(58) Field of Classification Search
USPC .................. 711/103, 135, 173, 202, 206
See application file for complete search history.

(56) References Cited

U.S. PATENT DOCUMENTS

| | | | |
|---|---|---|---|
| 4,937,830 A | 6/1990 | Kawashima et al. | |
| 5,341,489 A | 8/1994 | Heiberger et al. | |
| 5,559,449 A * | 9/1996 | Padoan et al. | 326/40 |
| 5,613,144 A | 3/1997 | Hall et al. | |
| 5,615,162 A | 3/1997 | Houston | |
| 5,673,223 A * | 9/1997 | Park | 365/185.17 |
| 5,751,631 A * | 5/1998 | Liu et al. | 365/185.01 |
| 6,092,158 A * | 7/2000 | Harriman et al. | 711/151 |
| 6,134,149 A * | 10/2000 | Lin | 365/185.29 |
| 6,148,354 A | 11/2000 | Ban et al. | |
| 6,449,111 B1 | 9/2002 | Kool et al. | |
| 6,684,301 B1 * | 1/2004 | Martin | 711/151 |
| 7,069,399 B2 * | 6/2006 | Lin et al. | 711/158 |
| 7,372,715 B2 | 5/2008 | Han | |
| 7,975,109 B2 | 7/2011 | McWilliams et al. | |
| 7,979,658 B2 | 7/2011 | Obereiner et al. | |
| 2002/0194451 A1 | 12/2002 | Mukaida et al. | |
| 2003/0046628 A1 | 3/2003 | Rankin | |
| 2003/0200411 A1 | 10/2003 | Maeda et al. | |
| 2004/0139286 A1 * | 7/2004 | Lin et al. | 711/151 |
| 2004/0153902 A1 | 8/2004 | Machado et al. | |
| 2004/0257888 A1 | 12/2004 | Noguchi et al. | |
| 2005/0166007 A1 | 7/2005 | Ono | |
| 2006/0059406 A1 | 3/2006 | Micheloni et al. | |

(Continued)

OTHER PUBLICATIONS

Toelkes et al., "Architecture for Address Mapping of Managed Non-Volatile Memory", U.S. Appl. No. 12/614,369, filed Nov. 6, 2009.

(Continued)

*Primary Examiner* — Reba I Elmore
(74) *Attorney, Agent, or Firm* — Meyertons, Hood, Kivlin, Kowert & Goetzel, P.C.

(57) ABSTRACT

A controller, techniques, systems, and devices for optimizing throughput of read operations in flash memory are disclosed. Various optimizations of throughput for read operations can be performed using a controller. In some implementations, read operations for a multi-die flash memory device or system can be optimized to perform a read request with a highest priority (e.g., an earliest received read request) as soon as the read request is ready. In some implementations, the controller can enable optimized reading from multiple flash memory dies by monitoring a read/busy state for each die and switching between dies when a higher priority read operation is ready to begin.

22 Claims, 10 Drawing Sheets

U.S. PATENT DOCUMENTS

| | | | |
|---|---|---|---|
| 2006/0164907 A1* | 7/2006 | Nguyen | 365/230.01 |
| 2006/0248432 A1 | 11/2006 | Barrett | |
| 2007/0043900 A1 | 2/2007 | Yun | |
| 2007/0050668 A1 | 3/2007 | Gans | |
| 2007/0106919 A1 | 5/2007 | Chang et al. | |
| 2007/0140007 A1 | 6/2007 | Terauchi | |
| 2007/0165458 A1 | 7/2007 | Leong et al. | |
| 2007/0168625 A1* | 7/2007 | Cornwell et al. | 711/157 |
| 2008/0069098 A1 | 3/2008 | Shah et al. | |
| 2008/0126776 A1 | 5/2008 | Takayama | |
| 2008/0147968 A1* | 6/2008 | Lee et al. | 711/103 |
| 2008/0147994 A1 | 6/2008 | Jeong et al. | |
| 2008/0195799 A1 | 8/2008 | Park et al. | |
| 2008/0211303 A1 | 9/2008 | Ikegawa | |
| 2008/0288814 A1 | 11/2008 | Kitahara | |
| 2009/0063934 A1 | 3/2009 | Jo | |
| 2009/0100115 A1 | 4/2009 | Park et al. | |
| 2009/0113114 A1 | 4/2009 | Berenbaum et al. | |
| 2009/0164698 A1 | 6/2009 | Ji et al. | |
| 2009/0198902 A1* | 8/2009 | Khmelnitsky et al. | 711/135 |
| 2009/0198947 A1* | 8/2009 | Khmelnitsky et al. | 711/202 |
| 2009/0198952 A1* | 8/2009 | Khmelnitsky et al. | 711/206 |
| 2009/0265513 A1 | 10/2009 | Ryu | |
| 2010/0250836 A1 | 9/2010 | Sokolov et al. | |
| 2010/0287329 A1* | 11/2010 | Toelkes et al. | 711/103 |
| 2010/0287353 A1* | 11/2010 | Khmelnitsky et al. | 711/170 |
| 2011/0153911 A1* | 6/2011 | Sprouse et al. | 711/103 |
| 2011/0213945 A1* | 9/2011 | Post et al. | 711/173 |

OTHER PUBLICATIONS

Wakrat et al., "Memory Array Power Cycling", U.S. Appl. No. 12/561,158, filed Sep. 16, 2009.

Wakrat et al., "File System Derived Metadata for Management of Non-Volatile Memory", U.S. Appl. No. 12/561,173, filed Sep. 16, 2009.

Toelkes et al., "Partial Page Operations for Non-Volatile Memory Systems", U.S. Appl. No. 12/536,410, filed Aug. 5, 2009.

Post et al., "Low Latency Read Operation for Managed Non-Volatile Memory", U.S. Appl. No. 12/538,053, filed Aug. 7, 2009.

Khmelnitsky et al., "Multipage Preparation Commands for Non-Volatile Memory Systems", U.S. Appl. No. 12/545,011, filed Aug. 20, 2009.

Toshiba, "TC58NVG0S3ETA00 Toshiba Mos Digital Integrated Circuit Silicon Gate CMOS," Nov. 20, 2008, revision 1.00, Semico Toshiba, pp. 1-65. http://www.semicon.toshiba.co.jp/docs/datasheet/en/Memory/TC58NVG0S3ETA00_en_datasheet_110301.pdf.

International Search Report/Written Opinion in PCT/US2009/065804 mailed May 10, 2010, 17 pages.

Invitation to Pay Additional Fees and, Where Applicable, Protest Fee in PCT/US2009/065804 mailed Mar. 4, 2010, 4 pages.

International Search Report/Written Opinion in PCT/US2010/032628 dated Aug. 11, 2010, 12 pages.

"Increasing Boot Operations with Managed NAND," QuickLogic® White Paper, Quicklogic Corporation [online], Retrieved from the Internet: <http://www.quicklogic.com/images/QL:_Increasing_Boot_Opt_w_Managed_NAND_WP_RevE.pdf>, 2007-2009, 8 pages.

"Dual supply level translator for dual memory cards (mini SD/micro SD + managed NAND)," STMicroelectronics, Paper No. ST6G3240 [online], Retrieved from the Internet: <http://www.st.com/stonline/products/literature/ds/14581.pdf>, Apr. 2008, 29 pages.

Lim et al., "An Efficient NAND Flash File System for Flash Memory Storage," IEEE Transactions on Computers, 2006, 55(7):906-912.

International Preliminary Report on Patentability in PCT/US2009/065804 mailed Jul. 7, 2011, 12 pages.

Authorized officer Yolaine Cussac, International Preliminary Report on Patentability in PCT/US2010/32627 mailed Nov. 9, 2011, 8 pages.

International Preliminary Report on Patentability in PCT/US2010/032628 dated Nov. 9, 2011, 8 pages.

Authorized officer Jacqueline Pitard, International Search Report/Written Opinion in PCT/US2010/32627 mailed Jul. 21, 2010, 10 pages.

* cited by examiner

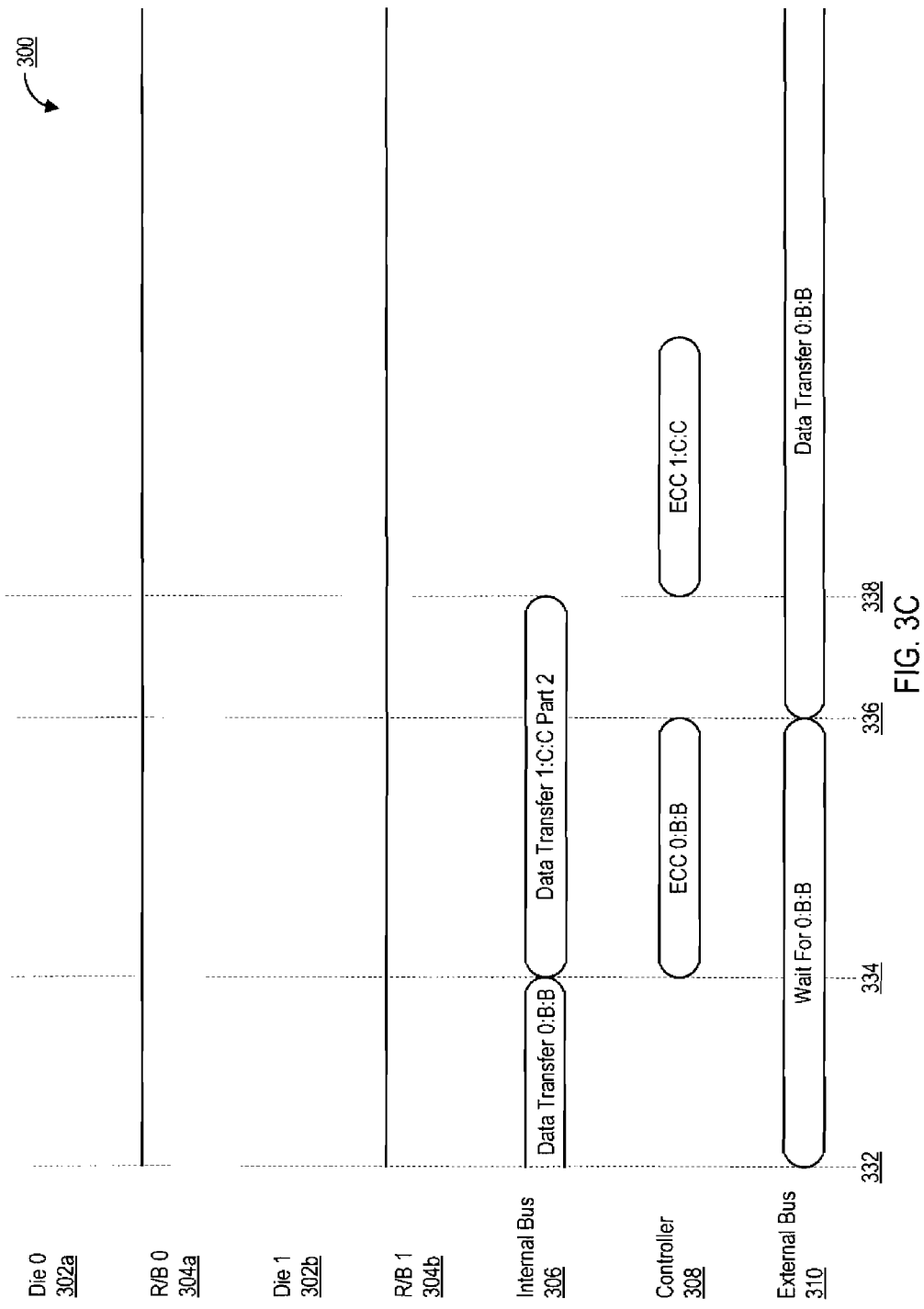

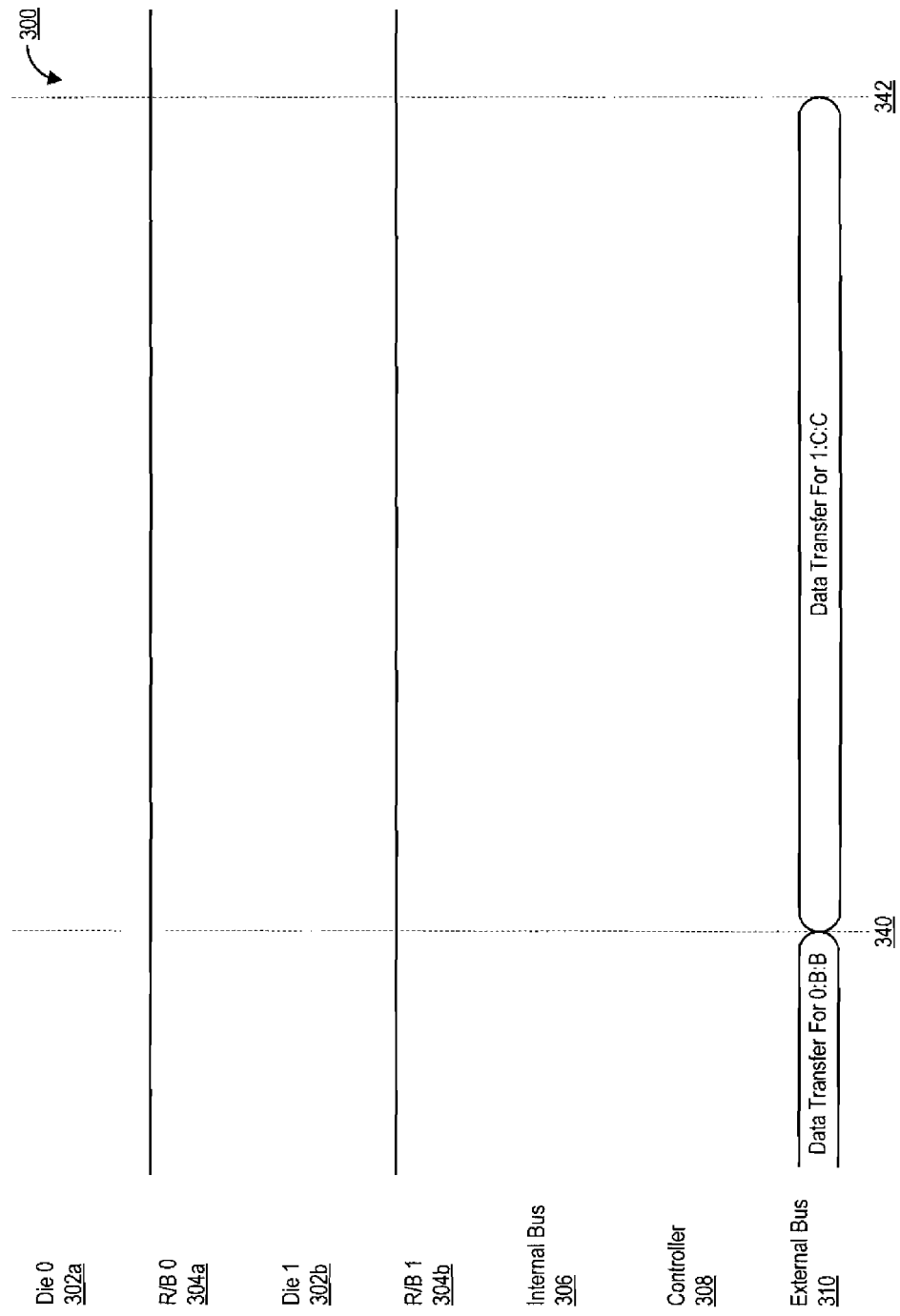

CONTROLLER FOR OPTIMIZING THROUGHPUT OF READ OPERATIONS

TECHNICAL FIELD

This subject matter is related generally to access and management of managed non-volatile memory.

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate.

NAND is a type of flash memory that can be accessed like a block device, such as a hard disk or memory card. Each block consists of a number of pages (e.g., 64-128 pages). A typical page size is 4 KB-8 KB bytes. A NAND device can have multiple dies each having 4096-8192 blocks. Associated with each page are a number of bytes that are used for storage of error detection and correction checksums. Reading and programming is performed on a page basis, erasure is performed on a block basis, and data in a block can only be written sequentially. NAND relies on Error Correction Code (ECC) to compensate for bits that may flip during normal device operation. When performing erase or program operations, the NAND device can detect blocks that fail to program or erase and mark the blocks as bad in a bad block map. The data can be written to a different, good block, and the bad block map updated.

Managed NAND devices combine raw NAND with a memory controller to handle error correction and detection, as well as memory management functions of NAND memory. Managed NAND is commercially available in Ball Grid Array (BGA) packages, or other Integrated Circuit (IC) package which supports standardized processor interfaces, such as Multimedia Memory Card (MMC) and Secure Digital (SD) card. A managed NAND device can include a number of NAND devices or dies, which can be accessed using one or more chip select signals. A chip select is a control line used in digital electronics to select one chip out of several chips connected to the same bus. The chip select is typically a command pin on most IC packages, which connects the input pins on the device to the internal circuitry of that device. When the chip select pin is held in the inactive state, the chip or device ignores changes in the state of its input pins. When the chip select pin is held in the active state, the chip or device responds as if it is the only chip on the bus.

The Open NAND Flash Interface Working Group (ONFI) has developed a standardized low-level interface for NAND flash chips to allow interoperability between conforming NAND devices from different vendors. ONFI specification version 1.0 specifies: a standard physical interface (pin-out) for NAND flash in TSOP-48, WSOP-48, LGA-52, and BGA-63 packages; a standard command set for reading, writing, and erasing NAND flash chips; and a mechanism for self-identification. ONFI specification version 2.0 supports dual channel interfaces, with odd chip selects (also referred to as chip enable or "CE") connected to channel 1 and even CEs connected to channel 2. The physical interface shall have no more than 8 CEs for the entire package.

While the ONFI specifications allow interoperability, the current ONFI specifications do not take full advantage of managed NAND solutions.

SUMMARY

A controller, techniques, systems, and devices for optimizing throughput of read operations in flash memory are disclosed. Various optimizations of throughput for read operations can be performed using a controller. In some implementations, read operations for a multi-die flash memory device or system can be optimized to perform a read request with a highest priority (e.g., an earliest received read request) as soon as the read request is ready. In some implementations, the controller can enable optimized reading from multiple flash memory dies by monitoring a read/busy state for each die and switching between dies when a higher priority read operation is ready to begin.

The controller, techniques, systems, and devices for optimizing throughput of read operations in flash memory are disclosed provide several advantages over conventional flash memory read operations. Some of these advantages include but are not limited to: 1) performing portions of lower priority read requests until a highest priority read request is ready to begin, 2) enabling a reading operation associated with a die to be paused and resumed in order to maximize sequential efficiency, 3) using multiple buffers to increase the speed by which multiple read operations are performed, and 4) enabling the realization of time savings associated with switching between read operations being performed on multiple flash memory dies.

BRIEF DESCRIPTION OF THE DRAWINGS

FIGS. 3A-D are timing diagrams showing an example optimized read operation performed using the memory systems described with regard to FIGS. 1 and 2.

DETAILED DESCRIPTION

Memory System Overview

Figure 1:
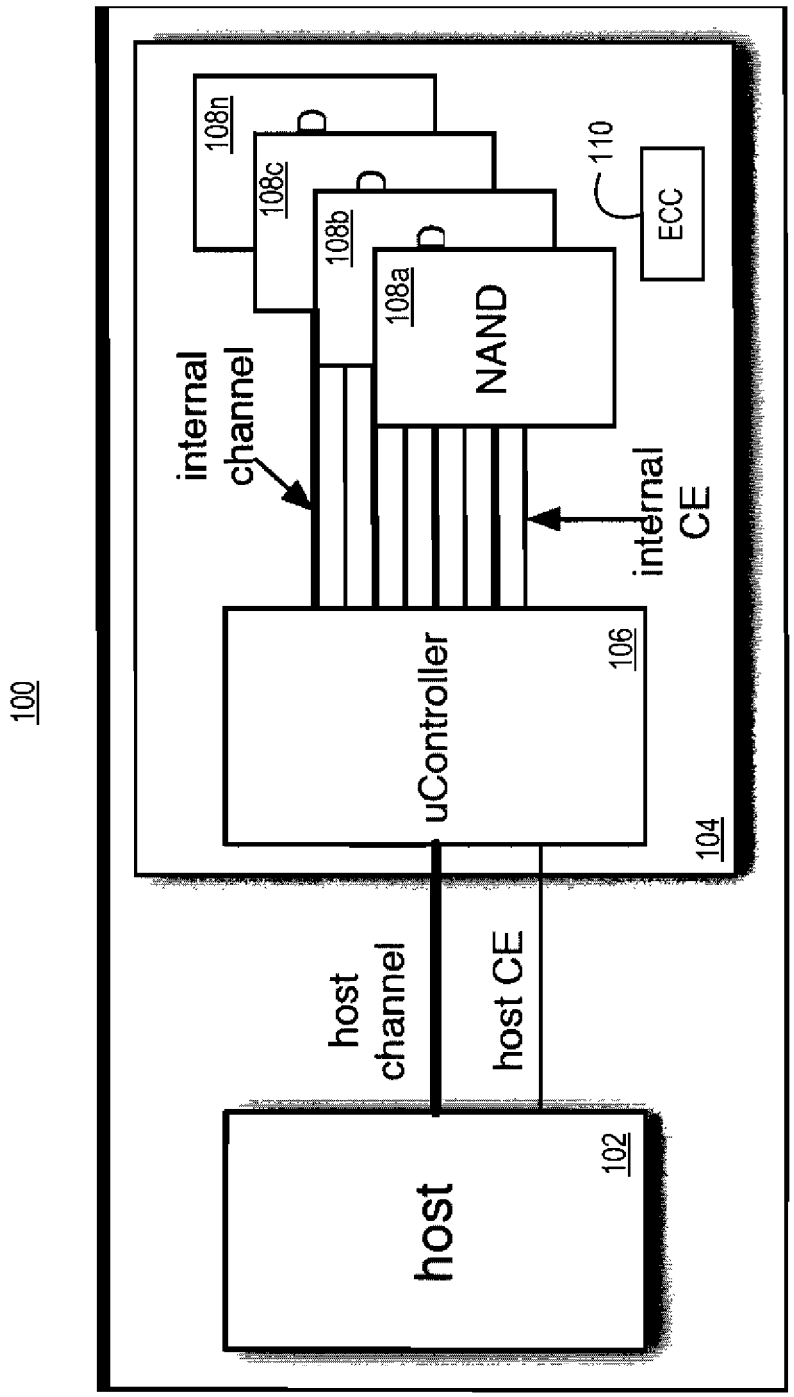
FIG. 1 is a block diagram of an exemplary memory system including a host processor coupled to a managed NVM package.

FIG. 1 is a block diagram of an exemplary memory system 100 including a host controller 102 coupled to a managed NVM package 104 (e.g., a NAND device). The NVM package 104 can be a BGA package or other IC package, including multiple NVM devices 108 (e.g., multiple raw NAND dies 108a-c,n). The memory system 100 can be used in a variety of devices, including but not limited to: handheld computers, mobile phones, digital cameras, portable music players, toys, thumb drives, email devices, and any other devices in which non-volatile memory is desired or required. As used herein, raw NVM is a memory device or package which is managed by an external host processor, and managed NVM is a memory device or package that includes at least one internal memory management function, such as error correction, wear leveling, bad block management, etc.

In some implementations, the NVM package 104 can include a controller 106 for accessing and managing the NVM devices 108 over internal channels using internal chip select signals. An internal channel is a data path between the controller 106 and a NVM device 108. The controller 106 can perform memory management functions (e.g., wear leveling, bad block management) and can include an error correction code (ECC) engine 110 for detecting and correcting data errors (e.g., flipped bits). In some implementations, the ECC engine 110 can be implemented as a hardware component in the controller 106 or as a software component executed by the controller 106. In some implementations, the ECC engine 110 can be located in the NVM devices 108.

In some implementations, the host controller 102 and NVM package 104 can communicate information (e.g., control commands, addresses, data) over a communication channel visible to the host ("host channel"). The host channel can support standard interfaces, such as raw NAND interfaces or dual channel interfaces, such as is described in ONFI specification version 2.0. The host controller 102 can also provide a host chip enable (CE) signal. The host CE is visible to the host controller 102 to select the host channel.

In the exemplary memory system 100, the NVM package 104 supports CE hiding. CE hiding allows the single host CE to be used for each internal channel in the NVM package 104, thus reducing the number of signals required to support the interface of the NVM package 104. Memory accesses can be mapped to internal channels and the NVM devices 108 using an address space and mapping scheme, as described in reference to FIGS. 2 and 3. Individual NVM devices 108 can be enabled using internal CE signals generated by the controller 106.

Example Memory System Architecture

Figure 2:
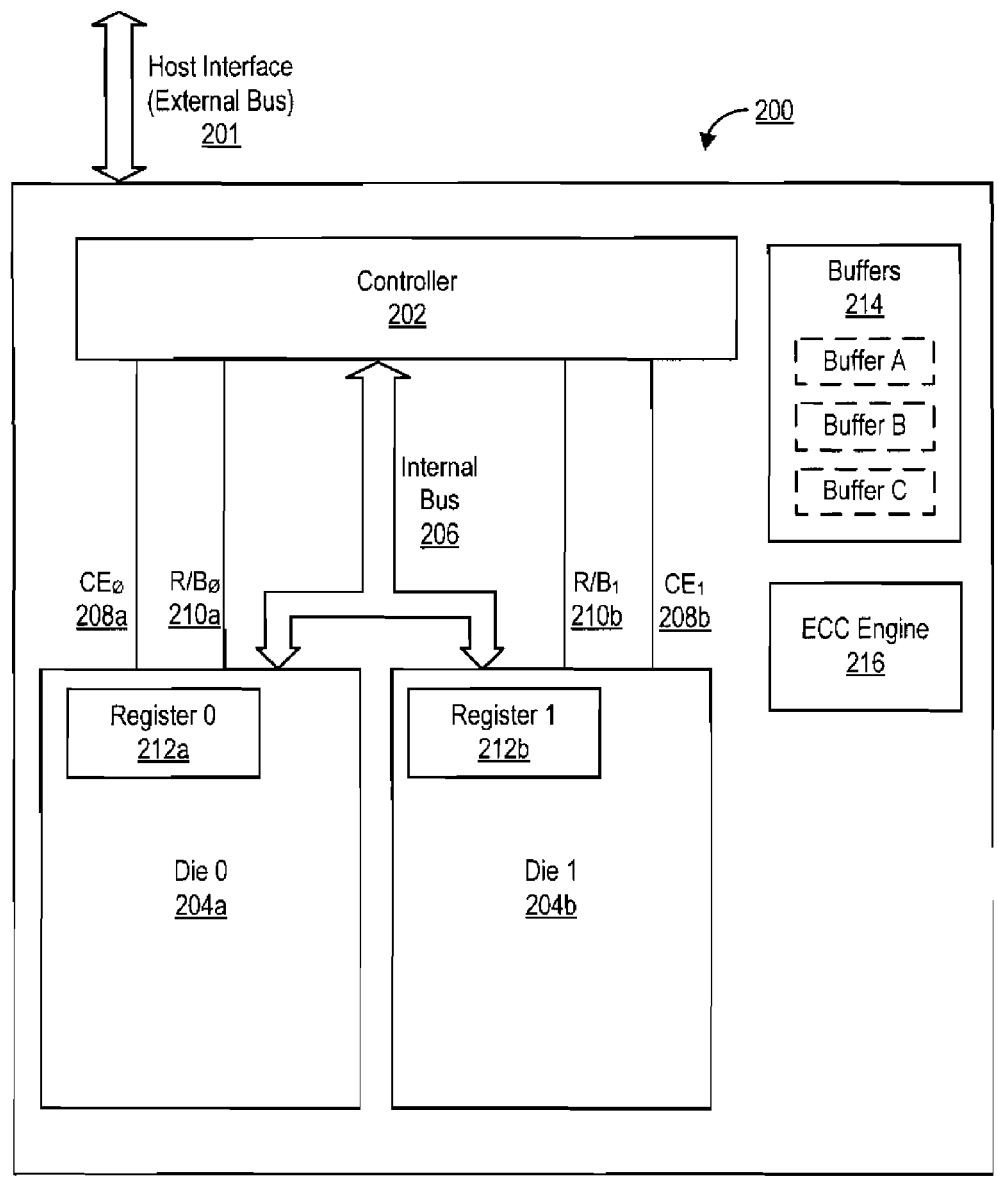
FIG. 2 is a block diagram of example memory system architecture for optimizing throughput of read operations.

FIG. 2 is a block diagram of example memory system architecture 200 for optimizing throughput of read operations. The example architecture 200 optimizes throughput by performing portions of lower priority read requests until a highest priority read request (e.g., an earliest received read request) is ready to begin on a shared internal bus in a multi-die system.

The example architecture 200 includes a host interface 201 (also known as an external bus) through which read requests are received by the memory system. A controller 202 manages optimization of the read requests received through the host interface 201. The controller 202 can be operatively connected to multiple flash memory dies 204a-b (die 0 and die 1) through an internal bus 206. As depicted in the example architecture 200, the internal bus 206 can be shared by the dies 204a-b. Read requests can be submitted by the controller 202 to the dies 204a-b via the internal bus 206. Similarly, in response to a read request, data can transmitted to the controller 202 by the dies 204a-b using the internal bus 206.

The memory dies 204a-b can each include multiple blocks of memory. As described above, each block can be segmented into multiple pages. A read request received by the controller 202 can specify the die, block, and page of the desired memory. An example read request can have the form [Die: Block:Page]. The controller 202 can transmit a received read request to a flash memory die using the same parameters and form.

The controller 202 and the dies 204a-b can also be communicatively connected via internal chip enable (CE) lines 208a-b and internal ready/busy (R/B) lines 210a-b. The internal CE lines 208a-b are depicted as $CE_\emptyset$ and $CE_1$, where $CE_\emptyset$ 208a connects the die 204a to the controller 202 and $CE_1$ 208b connects the die 204a to the controller 202. Chip enable signals can be sent by the controller 202 along the CE lines 208a-b to activate one of the dies 204a-b to handle a read request (e.g., the activated die can be the die specified in the received request). The R/B lines 210a-b can be used to transmit the present state (e.g., busy, ready to process a request) of the dies 204a-b to the controller 202.

To process a received read request, the dies 204a-b will first have to internally transfer the requested memory from its storage location on the die (e.g., the block and page location specified in the read request) to an internal register 212-ab. This internal transfer can be abbreviated as "tR" and can be termed initialization or set-up of a die for performing a read operation. Once the requested memory has been transferred into one of the registers 212a-b, the memory can then be transmitted to the controller using the internal bus 206.

For instance, if the controller 202 receives a read request 0:0:0 (request for page 0, block 0 of die 0), it can check that the die 204a is ready using the $R/B_\emptyset$ line 210a and can activate the die 204a by sending a chip enable signal along the $CE_\emptyset$ 208a. The die 204a can receive the request 0:0:0 via the internal bus 206 and can begin transferring the requested data (page 0, block 0) to the register 212a. When transferring the data to register 212a, the die 204a can designate that it is busy using the $R/B_\emptyset$ line 210a. Once the transfer of the requested data to the register 212a is complete, the die 204a can indicate it is ready to transfer the data to the controller 202 using the $R/B_\emptyset$ line 210a. The controller 202 can instruct the die 204a via the $CE_\emptyset$ 208a or the internal bus 206 when it is ready to receive the data. The die 204a may wait with the requested data in the register 212a for a while before being instructed to begin transferring the data to the controller 202. Once instructed by the controller 202, the die 204a can transmit the requested data from the register 212a to the controller 202 via the internal bus 206.

The controller 202 can store data transmitted from the dies 204a-b in one of multiple buffers 214 (e.g., buffer A, buffer B, buffer C). The buffers 214 can be implemented as physically separate buffers or as part of a single segmented buffer. The data can be transmitted from the buffers 214 to a host via the host interface 201 once all of the data has been received from one of the registers 212a-b. Before transferring the data to the host, error correction can be performed on the data using an error-correction code (ECC) engine 216.

The throughput of read operations performed by the architecture 200 can be optimized by the controller 202 in a variety of ways. For instance, if a read request is received for the die 204a and another read request is received for the die 204b, the controller 202 can have the dies 204a-b concurrently set-up the read requests by sending the read requests to the dies 204a-b back-to-back. Although one die can be read from via the internal bus 206 at a time, concurrent set-up can save time. For example, if the die 204a is transferring data to a first buffer and the die 204b is set-up for a transfer, upon completion of the transfer by die 204a, the die 204b can immediately begin transferring its data to a second buffer. The read request for the die 204b can begin instantaneously since it was already set-up—the set-up time is saved. Additionally, if an ECC operation is performed on the data from die 204a upon completion of the transfer to the first buffer, the ECC operation can be performed while the data from the die 204b is transferred to the second buffer—the time to perform the ECC operation is saved as well.

The controller 202 can also halt the transfer of data midstream from one of the dies 204a-b to initialize or perform read operations on the other die. The multiple buffers enable data transfers from the dies 204a-b to be started and stopped mid-stream. For example, if first and second requests are received from the die 204a and then a third request is received for the die 204b, the controller 202 can concurrently set-up the first and third requests on the dies 204a and 204b, respectively. After transferring the data for the first request to buffer A, the controller 202 can set-up the second request on die 204a and begin transferring the data for the third request to a buffer B. Since the controller 202 strives to return the requested data sequentially according a priority for each request (e.g., in the order in which the requests were received), the controller 202 can pause the transfer of data for the third request when the second request is set-up on the die 204a (e.g., the data for the second request is ready to be read from the die 204a). In this example, the second request can be termed to have a higher priority than the third request based upon the second request having been received before the third request. The controller 202 can then transfer the data for the second request to a buffer C and, upon completion with respect to the second request, return to transferring data for the third request from the die 204b to the buffer B. In addition to the other time savings mentioned above, the time it took for the second request to set-up is saved with respect to the transfer of data for the third request (e.g., the third request was able to transfer data to buffer B during set-up for the second request). Alternatively, if the system 200 is compared to a system that performs the third read operation to completion before beginning the second read operation, the time savings for the system 200 can be the time for the third request to finish after being resumed (e.g., the data from the second read operation can be transferred to the host interface 201 without having to wait for the third read operation to be completed).

The optimization techniques employed by the controller 202 can be implemented in hardware and/or software within the controller 202.

Example Timing Diagram of Optimized Read Operations

FIGS. 3A-D are timing diagrams 300 showing an example optimized read operation performed using the memory systems described with regard to FIGS. 1 and 2. The timing diagram depicts an example optimized read operation similar to the optimized read operation described above with regard to FIG. 2. Although various lengths of time are approximated in the timing diagrams 300, the depicted timing is presented for illustrative purposes. The times for the depicted operations may not be accurate and can vary.

Figure 3A:
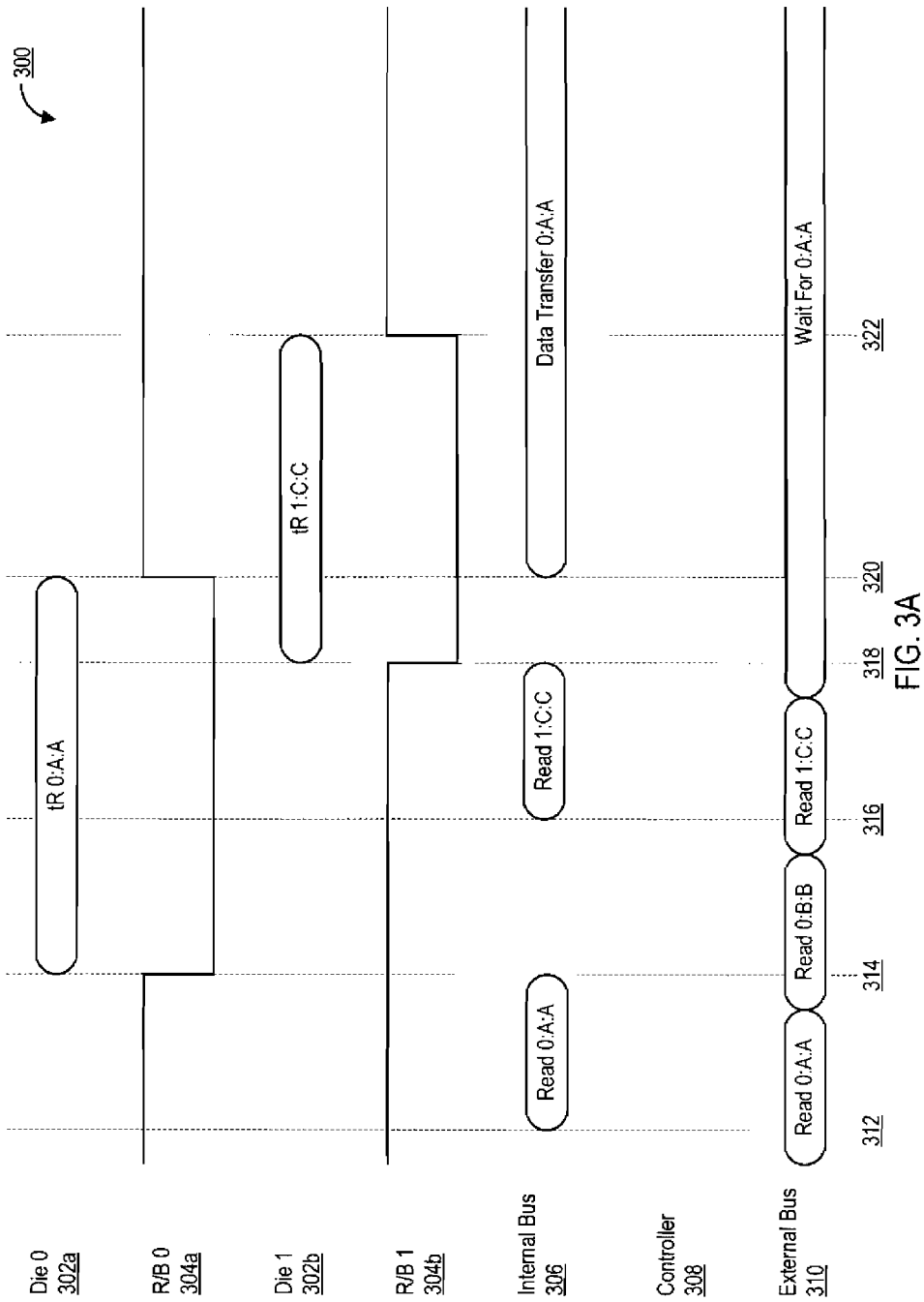

Referring to FIG. 3A, the timing diagram 300 contains rows for a die "0" 302a (e.g., die 204a), a R/B 304a corresponding to die 302a (e.g., R/B 210a), a die "1" 302b (e.g., die 204a), a R/B 304b corresponding to die 302b (e.g., R/B 210b), an internal bus 306 (e.g., internal bus 206), a controller 308 (e.g., controller 202), and an external bus 310 (e.g., host interface 201). The timing diagram 300 begins with die 302a and die 302b being ready and with external bus 310 receiving read requests 0:A:A (read die 0, block A, page A), 0:B:B (read die 0, block B, page B), and 1:C:C (read die 1, block C, page C). The read request 0:A:A is sent to the die 302a via the internal bus 306 (312) and the die 302a begins transferring the requested page (e.g., represented by tR 0:A:A) to a register (e.g., register 212a) (314). When this transfer is being performed, the R/B 304a for die 302a changes from ready to busy (314).

The read request 1:C:C is sent to the die 302b via the internal bus 306 (316) and the die 302b begins transferring the requested page (e.g., represented by tR 1:C:C) to a register (e.g., register 212b) (318). When this transfer is being performed, the R/B 304b for die 302b changes from ready to busy (318). Although the request 0:B:B was received before the request 1:C:C, the read operation for 1:C:C starts first because die 302b is free and die 302a is not. After the last read request 1:C:C is transmitted over the external bus 310, the external bus 310 waits for the data associated with the first request 0:A:A (the request with the highest priority).

When the transfer of 0:A:A to a register of die 302a is completed, R/B 304a changes from busy to ready and the transfer of data from the register to the controller 308 via the internal bus can start (320). As described above with regard to FIG. 2, the data transferred to the controller 308 can be stored in a buffer. When the transfer of 1:C:C to a register of die 302b is completed, R/B 304b changes from busy to ready (322). However, the data 1:C:C stored in the register of the die 302b is not transferred to the controller 308 via the internal bus 306 since the data 0:A:A is already being transferred on the internal bus 306. Optimized time savings are realized in the span between 320 and 322 when the read request 1:C:C is set-up for die 302b while data 0:A:A is transferred from die 302a using the internal bus 306.

Figure 3B:
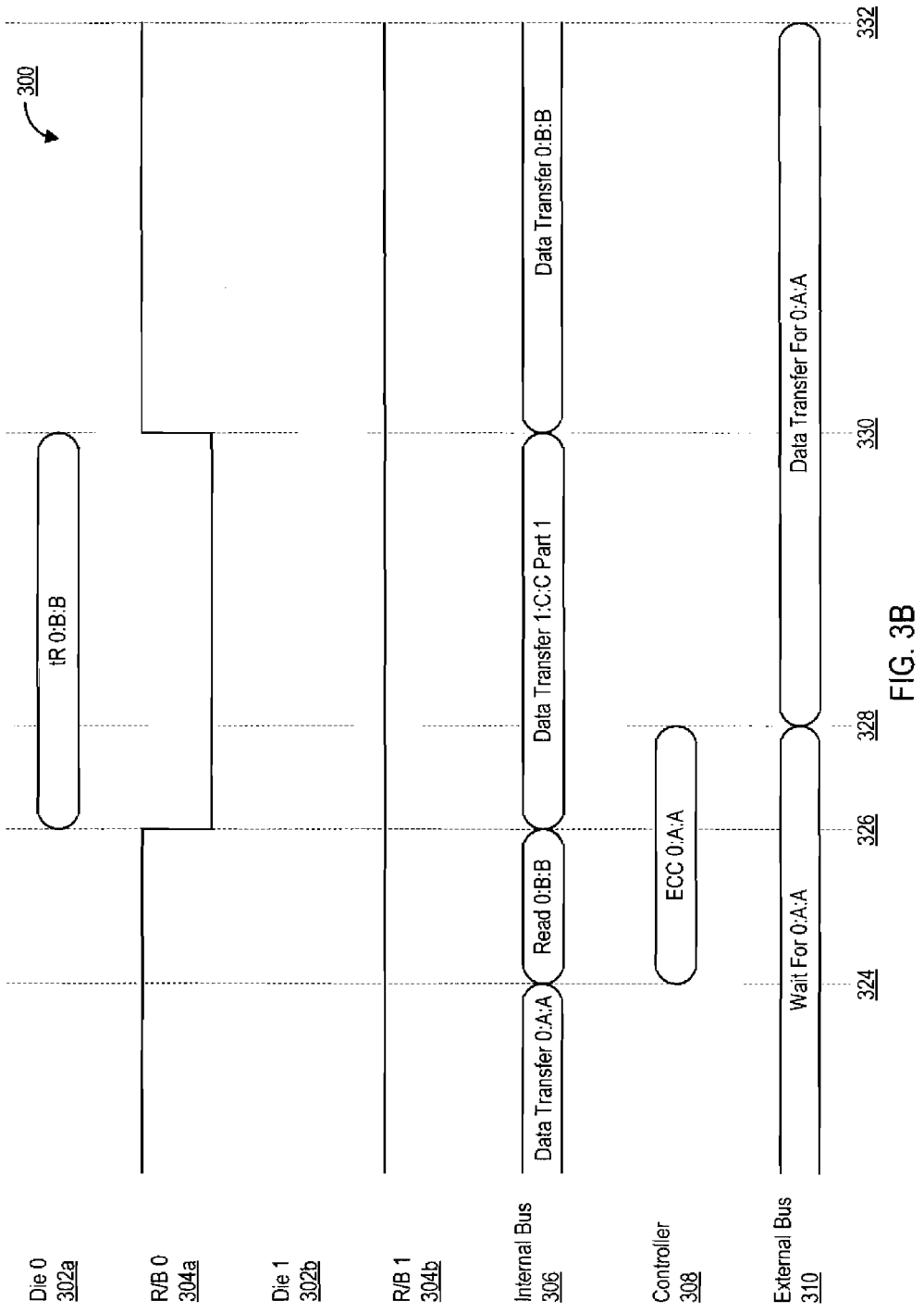

Referring to FIG. 3B, when the data transfer of 0:A:A via the internal bus 306 finishes, the read request for 0:B:B can be sent to the die 302a along the internal bus 306 and ECC operations are started by the controller 308 with regard to a buffer storing 0:A:A (324). The die 302a begins transferring the requested page 0:B:B (e.g., represented by tR 0:B:B) to a register (e.g., register 212a) and the R/B 304a changes from ready to busy (326). Since the internal bus 306 is no longer in use and the die 302b is set-up for a read with respect to 1:C:C, the transfer of data 1:C:C from a register in die 302b to the controller 308 and a buffer via the internal bus 306 can start (326). The data 1:C:C is transferred to a different buffer than the buffer storing data 0:A:A.

Once the ECC operation on data 0:A:A stored in a buffer is completed by the controller 308, the external bus 310 can begin transferring buffered data for 0:A:A out of the memory system (e.g., to a host) (328). Another time savings derived from the optimized read operations is demonstrated by the period between 326 and 328 with respect to the transfer of data 1:C:C to a buffer. Were the multiple buffers not provided, the transfer of 1:C:C may have to wait until after the data transfer of 0:A:A by the external bus 310 has begun (e.g., if only one buffer were provided, the data 1:C:C could not be added to it until at least a portion of the buffer is freed by the transfer of 0:A:A out of the buffer).

When the transfer of 0:B:B to a register of die 302a is finished, then the transfer of data 1:C:C by the internal bus 306 can stop (pause) and the transfer of data 0:B:B from the register to a buffer by the internal bus 306 can begin (330). The data 0:B:B can be stored in a buffer that is different than the buffer storing 0:A:A (as it is being transferred via the external bus 310) and the buffer storing the first part of data 1:C:C. Since the request to read 0:B:B was received before the request to read 1:C:C, the request associated with 0:B:B can be deemed to have higher priority. When the dies 302a-b are both set-up (ready) to transfer data to a buffer, the data for the higher priority request can take precedence. As depicted, both dies 302a-b were fully initialized to transfer data at 330. Since the request associated with 0:B:B has higher priority, the transfer of data 1:C:C (lower priority) is halted (paused) so that the higher priority data can proceed.

An additional time savings derived from the optimized read operations is demonstrated by the period between 326 and 330 with respect to the transfer of data 1:C:C. During this time period, a portion of the data for 1:C:C is transferred to a buffer even though the request for 1:C:C is lower priority (received later) than the request for 0:B:B. Were the requests to be processed in order of priority, the data 1:C:C transferred between 326 and 330 would not occur (be transferred) until after the transfer of 0:B:B is completed.

Referring to FIG. 3C, when the data transfer of 0:A:A by the external bus 310 ends, the external bus 310 waits for the transfer and ECC check of 0:B:B to be completed (step 332). When the data transfer of 0:B:B to a buffer via the internal bus 306 is complete, the data transfer of 1:C:C via the internal bus 306 can resume and the ECC check of 0:B:B (stored in a buffer) can be performed (334). Upon completion of the ECC check for 0:B:B, the data 0:B:B can be transferred out of the buffer using the external bus 310 (336). When the remaining portion of the data 1:C:C has been transferred to a buffer, an ECC check can be performed on the buffered data 1:C:C (338). Once the ECC check for data 1:C:C is completed, the buffered data for 1:C:C is not transferred out via the external bus 310 until the external bus is freed-up (e.g., no longer transferring data 0:B:B).

An alternative time saving derived from the optimized read operations is demonstrated by the period between 334 and 338. Compared to a system that would perform the read operation for 1:C:C to completion before beginning the read operation for 0:B:B, the period between 334 and 338 is saved with respect to the ECC check for 0:B:B and the transfer of 0:B:B via the external bus 310. In a system that would perform the read operation for 1:C:C to completion, the ECC check for 0:B:B and the data transfer of 0:B:B via the external bus 310 would not begin until 338 (e.g., the time when the transfer of both 0:B:B and 1:C:C would be completed). However, in the optimized read operation depicted permits the portions of the read operation for 0:B:B to begin at 334.

Referring to FIG. 3D, when the data transfer for data 0:B:B via the external bus 310 has been completed, the transfer for buffered data 1:C:C via the external bus 310 can begin (340). The read operations for 0:A:A, 0:B:B, and 1:C:C are complete once the transfer of the buffered data 1:C:C by the external bus 310 is finished (342).

Example Process for Optimizing Throughput of Read Operations

Figure 4A:
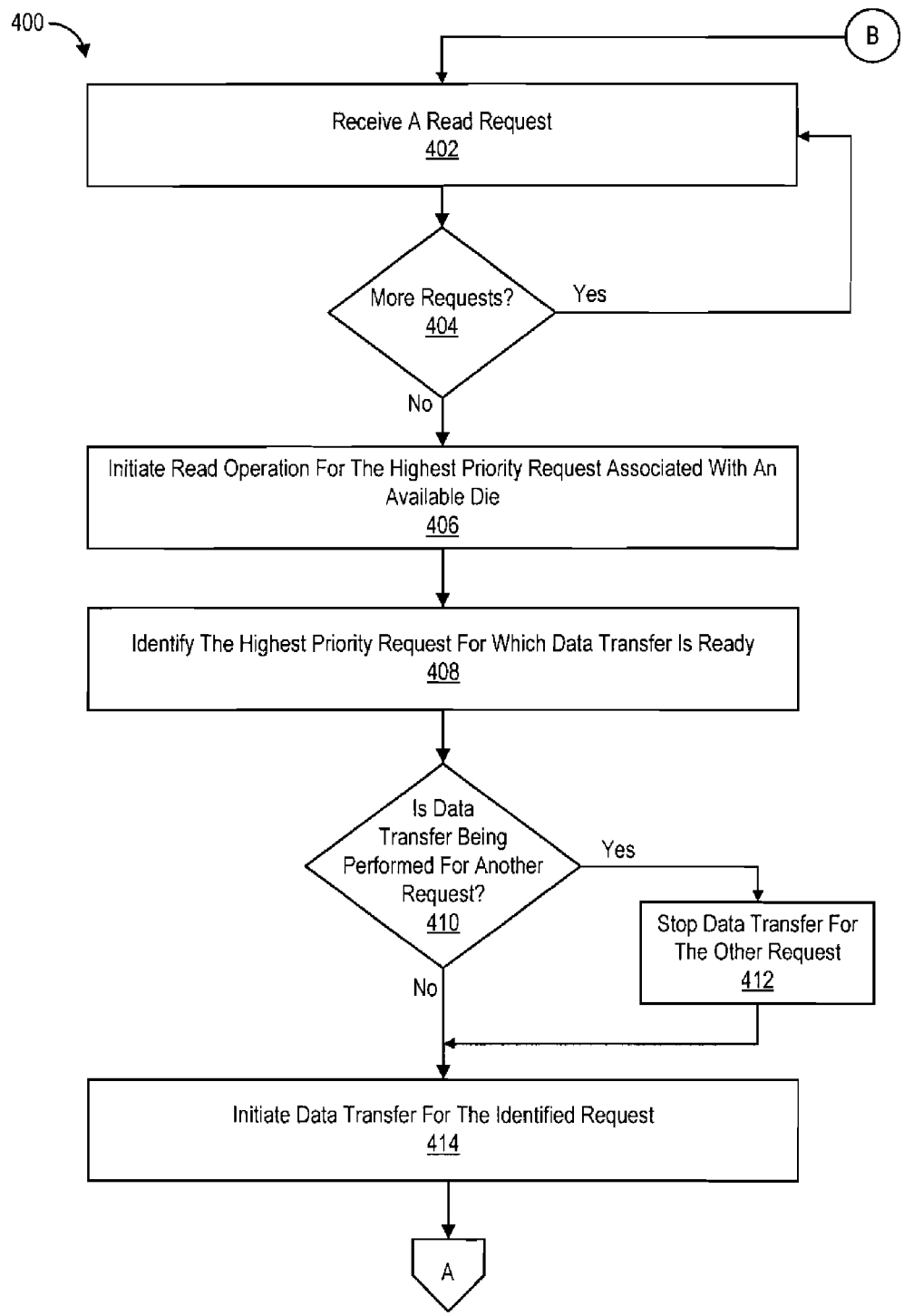
FIGS. 4A-B are flow diagrams of an example process for optimizing throughput of read operations performed using memory systems described with regard to FIGS. 1 and 2.
Figure 4B:
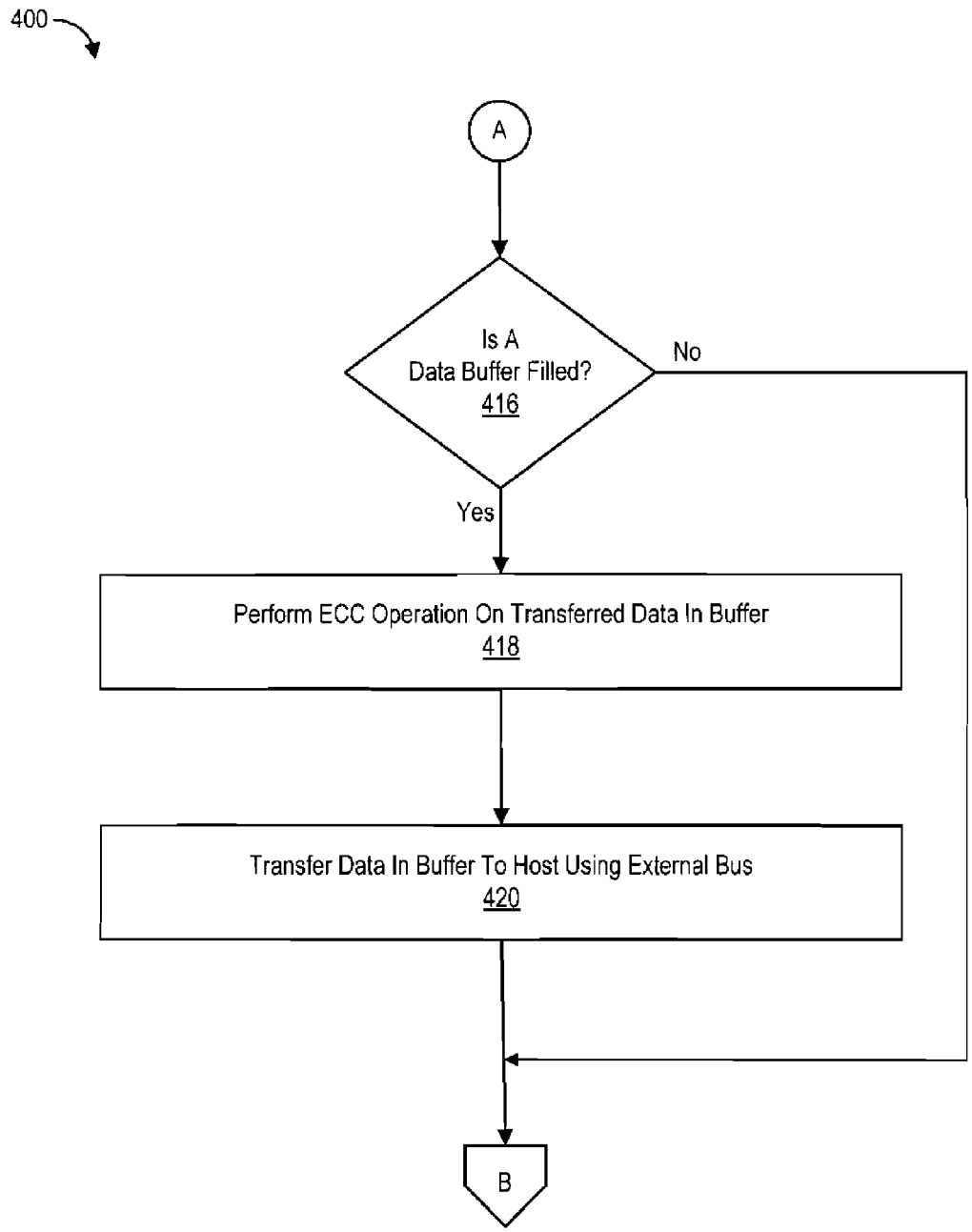

FIGS. 4A-B are flow diagrams of an example process 400 for optimizing throughput of read operations performed using memory systems described with regard to FIGS. 1-2. The example process 400 enables optimization of read operations across multiple dies within a memory system, such as the example optimizations described above with regard to FIGS. 2 and 3A-D. The example process 400 can be performed by a memory controller, such as the controller 202 described above with regard to FIG. 2.

Referring to FIG. 4, the process 400, in some implementations, can begin by receiving a read request (402) and checking for any additional read requests (404). A read operation for the highest priority request associated with an available memory die (e.g., a die that is ready and free to set-up a read operation) can be initiated (406). For instance, as described above with regard to FIG. 3A, read requests can be initiated at 312 and 316 for requests 0:A:A and 1:C:C, respectively. These read requests can be initiated since each of the requests has the highest priority with regard to their associated dies (e.g., 0:A:A is associated with die 302a and 1:C:C is associated with die 302b). Additionally, the associated dies are ready to receive read requests.

The highest priority request (regardless of die) for which a data transfer has been set-up (e.g., requested page has been transferred to a die's register) can be identified (408). For instance, as described above with regard to FIG. 3B, at time 330 the highest priority request for which a data transfer had been set-up is data request 0:B:B.

If the data transfer (via an internal bus) is currently being performed by another request (e.g., not the request with the highest priority) (410), then the current transfer of data for the other request (via the internal bus) can be stopped (412). Data transfer (via an internal bus) can be initiated for the identified request (414). For example, at time 330 as depicted in FIG. 3B, the data transfer associated with 1:C:C (a lower priority request) is stopped and a data transfer for 0:B:B (a higher priority request) is initiated. Data can be transferred to one of multiple buffers.

Referring to FIG. 4B, if a buffer to which requested data is being transferred has filled-up (e.g., the requested data has been fully transferred to the buffer) (416), then an ECC check can be performed on the buffered data (418) and the buffered data can be transferred to a host using an external bus (420). If the data buffer is not yet filled or if the buffered data has been transferred out to a host, then the process 400 can be repeated. The process 400 can persistently perform optimized memory read operations within a memory system, such as the memory systems described with regard to FIGS. 1-2.

Another Example Process for Optimizing Throughput of Read Operations

Figure 5A:
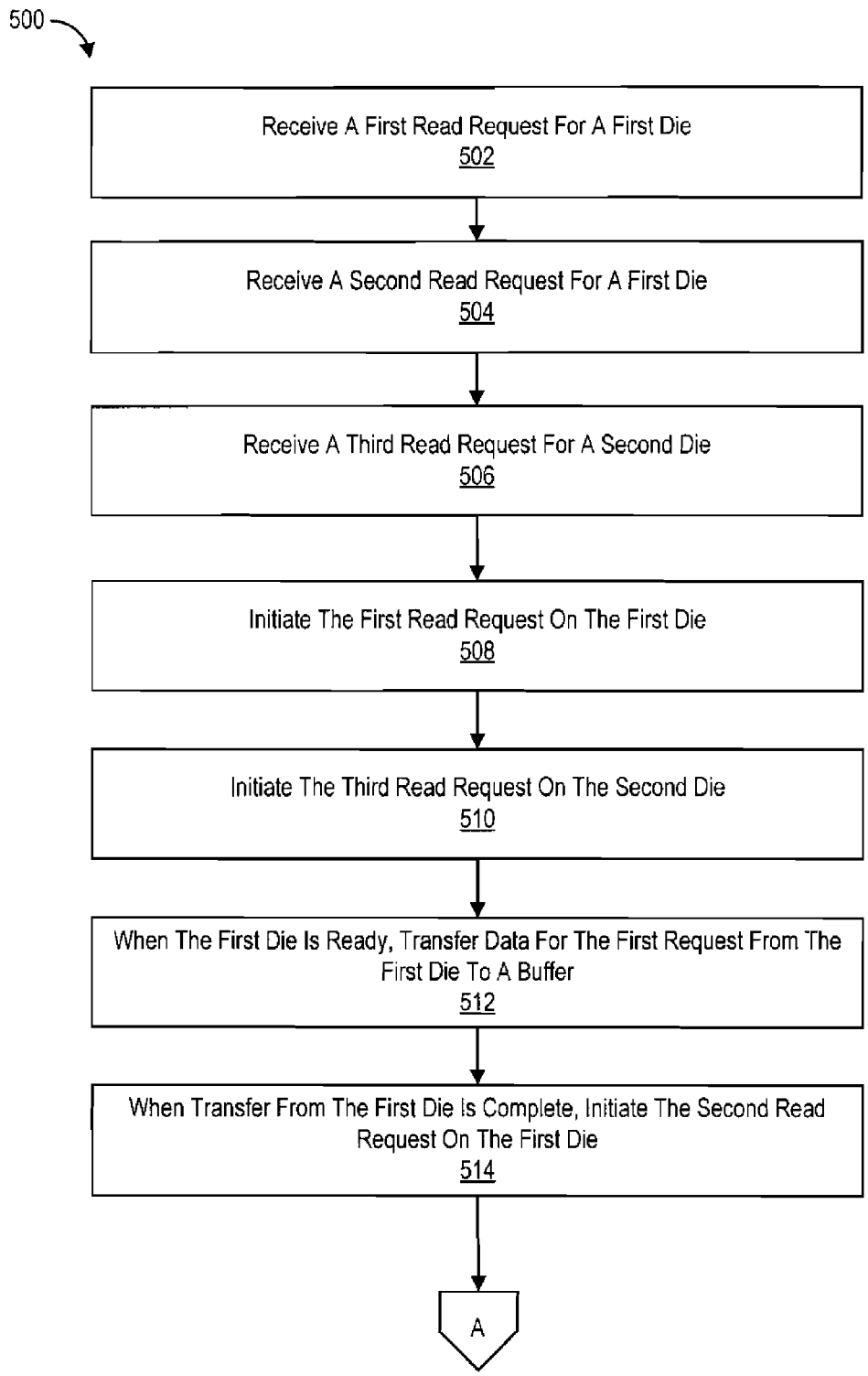
FIGS. 5A-B are flow diagrams of another example process for optimizing throughput of read operations performed using memory systems described with regard to FIGS. 1 and 2.
Figure 5B:
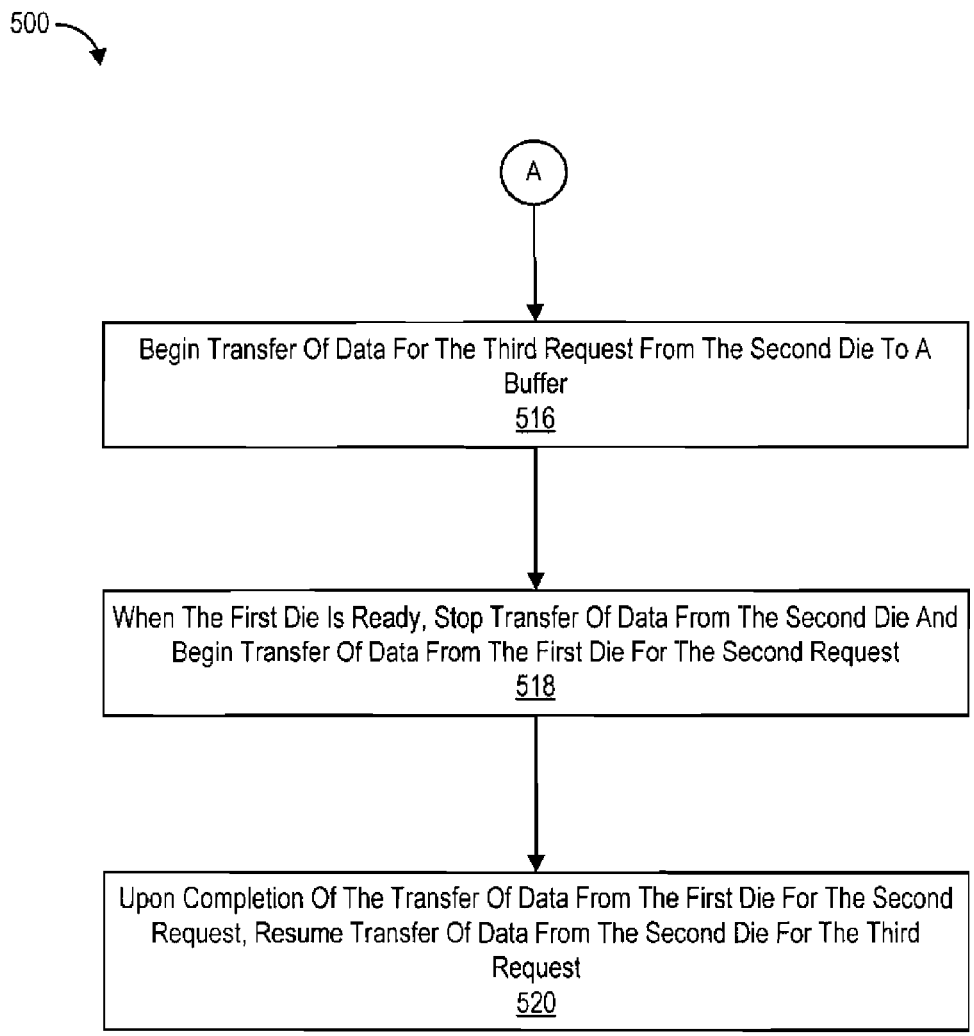

FIGS. 5A-B are flow diagrams of another example process 500 for optimizing throughput of read operations performed using memory systems described with regard to FIGS. 1-2. The example process 500 enables optimization of read operations across multiple dies within a memory system, such as the example optimizations described above with regard to FIGS. 2 and 3A-D. The example process 500 can be performed by a memory controller, such as the controller 202 described above with regard to FIG. 2. The process 500 is similar to the steps taken in the timeline 300, as described above with regard to FIGS. 3A-D.

Referring to FIG. 5A, a first read request for a first memory die (502), a second read request for a first memory die (504), and a third read request for a second memory die (506) are received. The first request can have the highest priority, the second request can have the second highest priority, and the third request can have the lowest priority. The first read request is initiated on the first die (508) and the third read request is initiated on the second die (510). Initiation of a read request may involve the memory die transferring the page to be read into a register (e.g., 212a-b). When the first die is ready (e.g., the first die has set-up for the request) data for the first request is transferred from the first die to a buffer (e.g., buffers 214) (512). When the transfer from the first die is complete, the second read request can be initiated on the first die (514).

Referring to FIG. 5B, transfer of data for the third request from the second die to a buffer can begin (516). When the first die is ready with respect to the second request (e.g, the second request has been transferred to a register in the first die), transfer of data from the second die can be stopped and transfer of data from the first die for the second request can begin (518). Such an operation can be performed since the second request can be deemed to have a higher priority than the third request (e.g., the second request was received at 504 before the third request at 506). Upon completing the transfer of data from the first die for the second request (e.g., the data for the second request has been fully transferred to a buffer), the transfer of data from the second die for the third request can be resumed (520). The buffer to which the data for third request is written can remain in the same state as when it was stopped at 518. Additionally, the die can retain the state of the transfer when it was stopped, which enables the die to resume the transfer.

In addition to the embodiments and examples described above, a variety of alternative embodiments are possible. For example, for simplicity of presentation, the multi-die systems described above contain only two dies. However, the disclosed read operations for optimizing throughput can be used on multi-die systems with having more than two dies (e.g., systems with 3 dies, 4 dies, 6 dies, 8 dies, etc.). Increasing the number of dies may require an increase in buffer space that is needed to perform the disclosed read operations.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
reading first data from a first flash memory die using an internal bus in response to a first read request;
pausing reading of the first data from the first flash memory die upon second data being ready to be read from a second flash memory die, where the second data is read from the second flash memory die in response to a second read request that has a higher priority than the first read request;
reading the second data from the second flash memory die using the internal bus; and
resuming reading of the first data from the first flash memory using the internal bus;
wherein the method further comprises:
storing the first data read from the first flash memory die in a first buffer, wherein a portion of the first data is stored in the first buffer before reading of the first data from the first flash memory die is paused and where a remaining portion of the first data is stored in the first buffer after the second data is read from the second flash memory die using the internal bus;
storing the second data read from the second flash memory die in a second buffer; and
checking the second data stored in the second buffer for errors.

2. The method of claim 1, further comprising:
transmitting the second data to a host that is external to a device containing the first and second flash memory dies using an external bus; and
transmitting the first data the host using the external bus, where the first data is transmitted to the host using the external bus after the second data is transmitted to the host using the external bus.

3. The method of claim 1, where the first flash memory die is different than the second flash memory die.

4. The method of claim 1, where a signal from the second flash memory die indicates that the second data is ready to be read from the second flash memory die.

5. The method of claim 1, where the second read request has a higher priority than the first read request based upon the second read request having been received before the first read request.

6. The method of claim 1, where reading of the first data from the first flash memory die resumes after the second data is read from the second flash memory die using the internal bus.

7. The method of claim 1, where the second data is ready to be read from the second flash memory die when at least a portion of the second data has been transferred to a register for the second flash memory die.

8. The method of claim 1, further comprising:
reading third data from the second flash memory die using the internal bus in response to a third read request, where the third data is read from the second flash memory die before the second data is read from the second flash memory die based upon the third read request having a higher priority than the second read request, where the third read request has a higher priority than the second read request based upon the third read request having been received before the second read request.

9. The method of claim 8, where reading the first data from the first flash memory die using the internal bus begins after the third data has been read from the second flash memory die using the internal bus.

10. The method of claim 8, further comprising:
instructing, using the internal bus, the second flash memory die to prepare the second data to be read from the second flash memory die after the third data has been read from the second flash memory die using the internal bus.

11. A system for optimizing memory read operations comprising:
a first flash memory die;
a second flash memory die that is different than the first flash memory die;
an external bus configured to receive read requests from a host for data stored in the first and second flash memory dies; and
a controller coupled to the external bus and configured to pause first data being read from the first flash memory die in response to a first read request when second data is ready to be read from the second flash memory die in response to a second read request, where the second read request has a higher priority than the first read request;
a plurality of buffers that are configured to store data being read from the first and second flash memory dies, wherein a first buffer of the plurality buffers stores a portion of the first data being read from the first flash memory die while the second data is read from the second flash memory die and stored in a second buffer of the plurality buffers, where a remaining portion of the first data is transferred to the first buffer after the second data has been read from the second flash memory die; and wherein, the controller is further configured to check the second data stored in the second buffer for errors.

12. The system of claim 11, further comprising:

an internal bus connecting the controller to the first and second flash memory dies, where data is read from the first and second flash memory dies using the internal bus.

13. The system of claim 11:

wherein the second data is ready to be read from the second flash memory die when at least a portion of the second data has been transferred to a register for the second flash memory die.

14. The system of claim 11, where external bus is further configured to transfer data read from the first and second flash memory dies to the host, where the second data is transferred to the host using the external bus before the first data is transferred to the host using the external bus.

15. The system of claim 11, where the second read request has a higher priority than the first read request based upon the second read request having been received through the external bus before the first read request.

16. A flash memory device comprising:

a first flash memory die;

a second flash memory die that is different than the first flash memory die;

an external bus configured to receive read requests from a host for data stored in the first and second flash memory dies, where the host is external to the flash memory device; and a controller coupled to the external bus and configured to pause first data being read from the first flash memory die in response to a first read request when second data is ready to be read from the second flash memory die in response to a second read request, where the second read request has a higher priority than the first read request;

a plurality of buffers that are configured to store data being read from the first and second flash memory dies, wherein a first buffer of the plurality buffers stores a portion of the first data being read from the first flash memory die while the second data is read from the second flash memory die and stored in a second buffer of the plurality buffers, where a remaining portion of the first data is transferred to the first buffer after the second data has been read from the second flash memory die; and wherein, the controller is further configured to check the second data stored in the second buffer for errors.

17. The device of claim 16, further comprising:

an internal bus connecting the controller to the first and second flash memory dies, where data is read from the first and second flash memory dies using the internal bus.

18. The device of claim 16:

wherein the second data is ready to be read from the second flash memory die when at least a portion of the second data has been transferred to a register for the second flash memory die.

19. The device of claim 16, where external bus is further configured to transfer data read from the first and second flash memory dies to the host, where the second data is transferred to the host using the external bus before the first data is transferred to the host using the external bus.

20. The device of claim 16, where the second read request has a higher priority than the first read request based upon the second read request having been received through the external bus before the first read request.

21. A method comprising:

receiving a first request to read first data from a first flash memory die;

receiving a second request to read second data from the first flash memory die;

receiving a third request to read third data from a second flash memory die, where the first request has higher priority than the second and third requests, and where the second request has higher priority than the third request;

reading the first data from the first flash memory die using an internal bus;

storing the first data read from the first flash memory die in a first buffer;

instructing, using the internal bus, the first flash memory die to prepare the second data to be read from the first flash memory die;

reading the third data from second flash memory die using the internal bus;

storing the third data read from the second flash memory die in a second buffer;

pausing reading of the third data from the second flash memory die upon the second data being ready to be read from the first flash memory die;

reading the second data from the first flash memory die using the internal bus; storing the second data read from the first flash memory die in a third buffer;

resuming reading of the third data from the second flash memory die;

resuming storing of the third data read from the second flash memory die in the second buffer; and checking the second data stored in the third buffer for errors.

22. The method of claim 21, further comprising:

transmitting the first data read from the first flash memory die to an external host using an external bus;

transmitting the second data read from the first flash memory die to the external host using the external bus; and transmitting the third data from the buffer to the external host using the external bus.

* * * * *